(12) United States Patent
Warnecke

(10) Patent No.: US 9,623,804 B2
(45) Date of Patent: Apr. 18, 2017

(54) FOLDING CARGO COMPARTMENT FLOOR AND VEHICLE REAR-END STRUCTURE

(71) Applicant: IDEAL AUTOMOTIVE GMBH, Bamberg (DE)

(72) Inventor: Stephan Warnecke, Bamberg (DE)

(73) Assignee: IDEAL AUTOMOTIVE GMBH, Bamberg (DE)

( * ) Notice: Subject to any disclaimer, the term of this patent is extended or adjusted under 35 U.S.C. 154(b) by 0 days.

(21) Appl. No.: 15/022,812

(22) PCT Filed: Sep. 19, 2014

(86) PCT No.: PCT/IB2014/064674
§ 371 (c)(1),
(2) Date: Mar. 17, 2016

(87) PCT Pub. No.: WO2015/040588
PCT Pub. Date: Mar. 26, 2015

(65) Prior Publication Data
US 2016/0229347 A1    Aug. 11, 2016

(30) Foreign Application Priority Data

Sep. 19, 2013 (DE) .......................... 10 2013 218 885

(51) Int. Cl.
| | | |
|---|---|---|
| *B60R 11/06* | (2006.01) | |
| *B60R 5/04* | (2006.01) | |
| *B60R 13/01* | (2006.01) | |

(52) U.S. Cl.
CPC .............. *B60R 5/04* (2013.01); *B60R 13/013* (2013.01)

(58) Field of Classification Search
CPC  B60R 7/02; B60R 5/04; B60R 13/013; B60R 5/045; B60N 2/36; B64D 9/00; B64C 1/20
(Continued)

(56) References Cited

U.S. PATENT DOCUMENTS

| | | |
|---|---|---|
| 2,493,368 A | 1/1950 | Smelker |
| 4,279,439 A * | 7/1981 | Cantieri .................. B60R 13/01 |
| | | 105/423 |

(Continued)

FOREIGN PATENT DOCUMENTS

| | | |
|---|---|---|
| DE | 4420439 A1 | 12/1995 |
| DE | 102010056400 A1 | 6/2012 |

(Continued)

OTHER PUBLICATIONS

PCT, "International Search Report for International Application No. PCT/IB2014/064674".

*Primary Examiner* — Kiran B Patel
(74) *Attorney, Agent, or Firm* — Manabu Kanesaka

(57) ABSTRACT

A folding luggage- or cargo compartment floor of a motor vehicle has a textile covering layer and under the cargo compartment floor, at least one receptacle is provided, whose opening is closed by a cover flap of the cargo compartment floor. To achieve a remedy against deformations of the kind that can occur due to unilateral static loads, the invention proposes that the cover flap be linked to the cargo compartment floor in a hinge-like fashion, so that directly adjacent regions of these components, in at least some places, engage with each other or are in reciprocal engagement with each other in a fashion similar to a set of teeth like a set of teeth; and an upper region of the one component always covers a lower region of the set of teeth on the respective other component. A rear-end structure of a motor vehicle includes the compartment.

10 Claims, 3 Drawing Sheets

Figure 1:
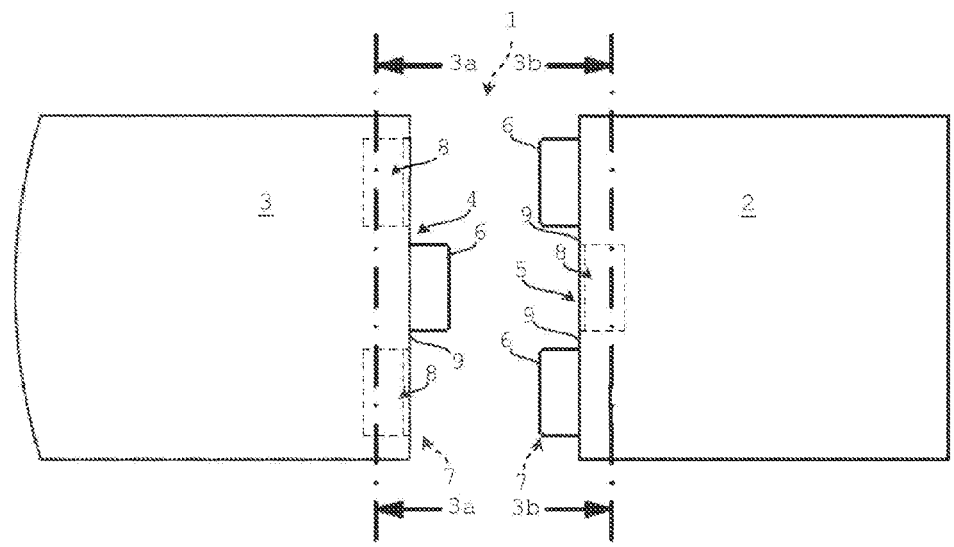

(58) Field of Classification Search
USPC ............ 296/37.14, 24.43, 37.1, 37.16, 37.6, 296/100.06; 244/137.1, 118.1
See application file for complete search history.

(56) References Cited

U.S. PATENT DOCUMENTS

| | | | | |
|---|---|---|---|---|
| 4,943,105 A * | 7/1990 | Kacar | ................. | A01K 1/0272 119/28.5 |
| 5,474,829 A * | 12/1995 | Woosley | ................ | B60N 3/048 112/410 |
| 5,484,091 A * | 1/1996 | Malinowski | .............. | B60R 7/02 224/42.33 |
| 5,568,890 A * | 10/1996 | Magee | ................. | B60P 7/0807 224/42.32 |
| 5,570,921 A * | 11/1996 | Brooker | .................... | B60R 5/04 224/542 |
| 5,649,731 A * | 7/1997 | Tognetti | ............. | B62D 33/0273 296/26.09 |
| 5,979,725 A * | 11/1999 | Lehrman | .................. | B60R 7/02 220/23.87 |
| 5,979,964 A * | 11/1999 | Ban | ...................... | B60N 2/3011 296/65.09 |
| 6,033,003 A * | 3/2000 | Bell | ........................ | B60R 13/01 296/37.3 |
| 6,247,741 B1 * | 6/2001 | Seel | ......................... | B60R 5/00 296/37.14 |
| 7,007,997 B1 * | 3/2006 | Wieczorek | ......... | B62D 25/2072 296/191 |
| 7,090,274 B1 * | 8/2006 | Khan | ....................... | B60R 5/04 296/37.14 |
| 7,118,151 B2 * | 10/2006 | Bejin | ....................... | B60R 5/04 296/37.1 |
| 7,794,004 B2 * | 9/2010 | Aebker | ..................... | B60R 5/04 296/37.8 |
| 8,215,693 B2 * | 7/2012 | Ulita | ......................... | B60R 5/04 296/37.1 |
| 8,505,999 B2 * | 8/2013 | Whalen | ................ | B60N 2/3013 296/65.09 |
| 8,808,828 B2 * | 8/2014 | Preisler | .................... | B32B 3/12 296/39.1 |
| 8,936,301 B2 * | 1/2015 | Thota | .................... | B60N 2/206 296/193.07 |
| 2002/0014777 A1 * | 2/2002 | Gehring | ................... | B60R 7/02 296/37.5 |
| 2003/0057724 A1 | 3/2003 | Inagaki et al. | | |
| 2014/0070560 A1 * | 3/2014 | Young | ....................... | B60R 5/04 296/37.14 |
| 2015/0151685 A1 * | 6/2015 | Horst | ..................... | B60R 5/044 296/24.44 |
| 2015/0217666 A1 * | 8/2015 | Garbarino | ............. | B60N 3/046 428/100 |

FOREIGN PATENT DOCUMENTS

EP     1477366 A1    11/2004
EP     2628644 A2    8/2013

* cited by examiner

FOLDING CARGO COMPARTMENT FLOOR AND VEHICLE REAR-END STRUCTURE

RELATED APPLICATIONS

The present application is National Phase of International Application No. PCT/IB2014/064674 filed Sep. 19, 2014, and claims priority from German Patent Application No. DE 10 2013 218 885.4, filed Sep. 19, 2013, the disclosure of which is hereby incorporated by reference herein in its entirety.

The present invention relates to a folding luggage- or cargo compartment floor, which has a textile covering layer and under which at least one receptacle is provided, whose opening is closed by a cover flap in the luggage compartment floor. Such a folding luggage- or cargo compartment floor may be used in any kind of motor vehicles e.g. to cover at least the region over a spare wheel and tools in the boot of a car and the like. The present invention also relates a rear-end structure of a motor vehicle equipped with a folding luggage- or cargo compartment floor.

A folding luggage- or cargo compartment floor and a corresponding vehicle rear-end structure of the type mentioned above are particularly known from passenger cars, see e.g. DE 44 20 439 A1. In this case, at least one receptacle is provided for accommodating a spare tire with an emergency tool kit under a cover flap in the cargo compartment floor in the boot or trunk. This cover flap is connected to the cargo compartment floor and thus forms a folding part of the luggage- or cargo compartment floor. The entire region of the cargo compartment or trunk is provided with a textile covering layer, usually in the form of glue-mounted carpeting, primarily for acoustic and noise-damping reasons.

Given the dictates of weight-saving with simultaneous cost pressure, it has turned out to be problematic that a cover flap and a surrounding cargo compartment floor connected to the cover flap can, under the influence of a heavier load, behave differently and in particular, can flex differently. Even due to a permissible continuous deformation resulting from a unilateral static load, a jamming can occur that no longer permits the cover flap to easily lift up from and/or fold down onto the cargo compartment floor. In addition, a uniform, flat floor surface can be interrupted due to a deformation, which can be amplified and produce a particularly unpleasant appearance due to an additional formation of wrinkles and the like in the textile covering layer.

The object of the present invention is to achieve a remedy in the form of a folding luggage- or cargo compartment floor and a vehicle rear-end structure equipped with a folding luggage- or cargo compartment floor.

This object is attained according to the invention by means of the features of claim 1 in that the cover flap is attached to the cargo compartment floor in a hinge-like fashion. The cover flap and the cargo compartment floor thus constitute components of a hinge-like connection in that they have regions that adjoin each other directly and that in at least some places, engage each other or are in reciprocal engagement with each other in a fashion similar to a set of teeth. In this case, an upper region of the one component as a layer always covers a lower region of the teeth on the respective other component. A reciprocal, nonpositive, frictional engagement is thus produced according to the invention between the cover flap and the adjacent region of the cargo compartment floor that is intended for the production of a link, which engagement also permits a reciprocal support of these parts and a static introduction of forces. As a result, at least a part of the load on a component that is subjected to a comparatively high mechanical load can be absorbed by the other component. Also in the case of a permanent deformation, this would no longer be restricted only to one of the two partner components. Even resulting mechanical damages due to a jamming are thus at least significantly reduced. Advantageous modifications are the subject of the dependent claims. According to these claims, the set of teeth in a region of a tooth depth is horizontally covered by a plane or layer, where this layer is about as thick in the vertical direction as the set of teeth.

In an advantageous embodiment of the invention, the upper layers of the components are situated adjacent to each other forming a boundary.

Further, the teeth of the one component and the teeth of the other component are offset from each other by 180°, i.e. a recess or valley of the one component coincides with a mountain or projecting tooth of the other component and vice versa; the respective upper layers of the components adjoin each other in the region of a tooth depth. Preferably, this boundary between the respective upper layers of the two components is a straight line. The teeth in one exemplary embodiment are embodied as essentially rectangular.

In a particularly advantageous fashion, the upper layers of the components, in a section lying horizontally above a region of a recess or valley, have a rounding that is in particular oriented toward the underlying plane with the set of teeth. An underlying tooth can thus roll along this rounding during an opening movement.

In a preferred embodiment of the invention, the cover flap on the cargo compartment floor is covered continuously and in essentially one piece with a textile covering layer, particularly in the form of carpeting. Preferably, this textile covering layer is glued in place over its entire area; in one embodiment of the invention, a strip in the region that functions as a hinge between the cover flap and the adjacent cargo compartment floor is not glued. Preferably, the dimensions of this non-glued region essentially correspond to those of the region of the teeth.

Advantageously, a folding cargo compartment floor or a cargo compartment floor is provided with at least one cover flap in a vehicle rear-end structure, in order particularly as a large-area cover of a receptacle for a spare tire, functioning as a complete component together with a surrounding cargo compartment floor, to be able to absorb and transmit force, for example due to unilateral permanent deformations, without the possibility of a jamming. In this connection, cover flaps of this kind generally have an edge dimension of approx. 800 mm. In addition, a vehicle rear-end structure that is equipped in this way features the fact that here, no hinges are provided as individual parts requiring separate installation, so that this can also achieve savings in terms of material and work time. If the cover flap and the cargo compartment floor are embodied in the form of molded parts manufactured out of a composite or fiber-reinforced material, then in addition, the above-described special molding of adjacent regions of the end surfaces of the cover flap and of the cargo compartment floor can be manufactured by means of a mold without further processing steps.

Figure 2A:
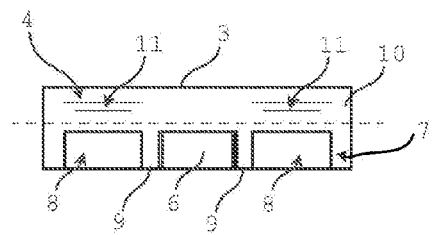
Figure 2B:
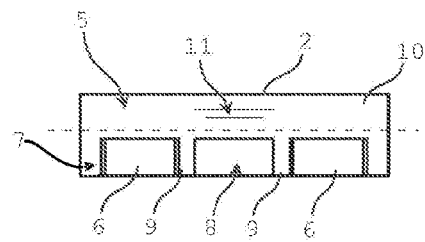
Figure 3A:
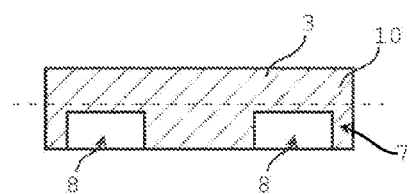
Figure 3B:
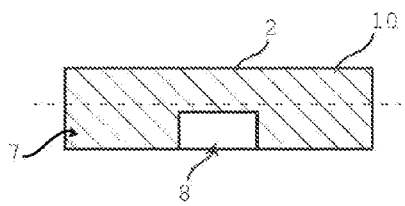
Figure 4:
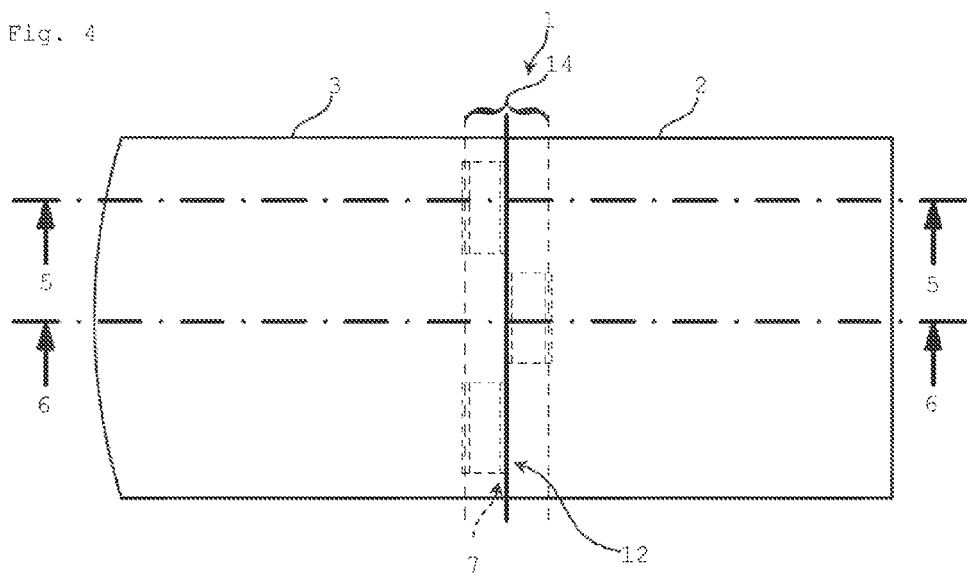
Figure 5:
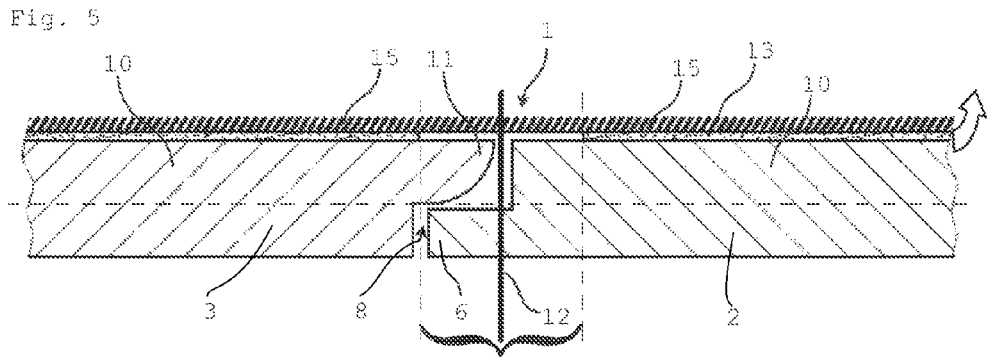

Other features and advantages of embodiments according to the invention are described in greater detail below with reference to exemplary embodiments taken in conjunction with the drawings. The drawings schematically depict the following:

FIG. 1: shows an embodiment of a hinge-like connection between a cover flap and a surrounding cargo compartment floor before assembly, in a top view with schematically depicted hidden edges; FIGS. 2a and 2b: show top views of the end-surface contact regions of the cover flap and cargo compartment floor that subsequently form the hinge-like connection; FIGS. 3a and 3b: show sectional depictions in the corresponding planes 3a -3a and 3b -3b from FIG. 1; FIG. 4: shows a top view of a section of a hinge-like connection between the cover flap and the surrounding cargo compartment floor according to FIG. 1, without the textile cover; FIG. 5: shows a sectional depiction in a plane 5 - 5 from FIG. 4, with the textile cover, FIG. 6: shows a sectional depiction in a plane 6 - 6 from FIG. 4, likewise with the textile cover. FIGS. 7a and 7b: show three dimensional sketches of bottom view and top view of a fur-ther embodiment and FIG. 8: shows a bottom view of a further embodiment according to the present invention.

Parts which remain the same have been consistently provided with the same reference numerals throughout the drawings.

The drawing in FIG. 1 shows a top view of a section of an exemplary embodiment of a hinge-like connection 1 between a cover flap 2 and a surrounding cargo compartment floor 3, before the assembly e.g. in the boot of a motor vehicle like a car. Regions 4, 5 of the cover flap 2 and the cargo compartment floor 3 that are adjacent to each other in an assembled position, as components of the hinge-like connection 1, constitute end surfaces that extend in a straight line on a top surface. The depicted section of the end surface 4 of the cargo compartment floor 3 has an essentially rectangular tooth 6 protruding from it, which functions as part of a continuous set of teeth 7 and opposite which a corresponding recess 8 is correspondingly provided on the side of the end surface 5 of the cover flap 2. In FIG. 1, the hidden edges of these recesses 8 in both the cover flap 2 and cargo compartment floor 3 have been schematically depicted with dashed lines.

The schematic depiction in FIG. 2a shows a top view of an end-surface contact region or end surface 4 of the adjacent cargo compartment floor 3. FIG. 2b is a top view of an end-surface contact region or the end surface 5 of the cover flap 2; these contact regions 4, 5 subsequently form the hinge-like connection 1. In the present exemplary embodiment, the set of teeth 7 includes teeth 6 and recesses 8, between which respective partitions 9 are situated. These top views clearly show that each of the end surfaces 4, 5 has a plane or layer 10 that lies above the set of teeth 7 that continuously alternates between teeth 6 and recesses 8. In addition, the layers 10 are approximately as thick or massive in the vertical direction as the embodiment selected for the layer with the set of teeth 7.

It is also clear from the schematic depictions in FIGS. 2a and 2b that in the planes 10 at the end surfaces 4, 5, a respective rounding 11 is provided in a region above each of the recesses 8. This rounding 11 is oriented toward the underlying plane with the set of teeth 7.

FIGS. 3a and 3b show sectional views in the corresponding planes 3a-3a and 3b-3b from FIG. 1, which are intended to illustrate a depth of the recesses 8 in the region of the set of teeth 7.

The schematic depiction in FIG. 4 shows a top view of a section of a hinge-like connection 1 between the cover flap 2 and the surrounding cargo compartment floor 3; to produce this connection, the components shown in FIG. 1 have been pushed together so that the teeth engage and the set of teeth 7 is covered by the upper layer 10. The only thing missing from the ready-to-use folding cargo compartment floor here is a textile covering layer. In this top view, the immediately adjacent regions 4, 5 of the end surfaces form a boundary 12 that extends in a straight line. The underlying set of teeth 7 is completely covered.

FIG. 5 is a sectional view along a plane 5 - 5 from FIG. 4, i.e. a section through a part of the cover flap 2 of the cargo compartment floor 3 with the hinge-like connection 1, which for acoustic and aesthetic reasons is then covered continuously and in essentially one piece with textile covering layer 13. The textile covering layer 13 here is embodied in the form of a carpeting material that is glued over its entire area onto the cover flap 2 and cargo compartment floor 3 that form a continuous plane; a strip 14 in the region of the hinge-like connection 1 that functions as a hinge between the cover flap 2 and the adjacent cargo compartment floor 3 is not glued to enable a certain movement of the textile covering layer 13. This is why a glue layer 15 beneath the textile covering layer 13 is depicted as interrupted. In this embodiment, the dimensions of the strip 14 correspond essentially to those of the region of the set of teeth 7, but it may also be smaller. This produces a one-piece arrangement with a hinge-like connection in which the cover flap 2 can even be pivoted relative to the cargo compartment floor 3 by up to approximately 180° even without being provided with any kind of hinge or articulation axis. In addition, the arrangement is also stable in its position due to the fixing by means of the textile covering layer 13.

Figure 6:
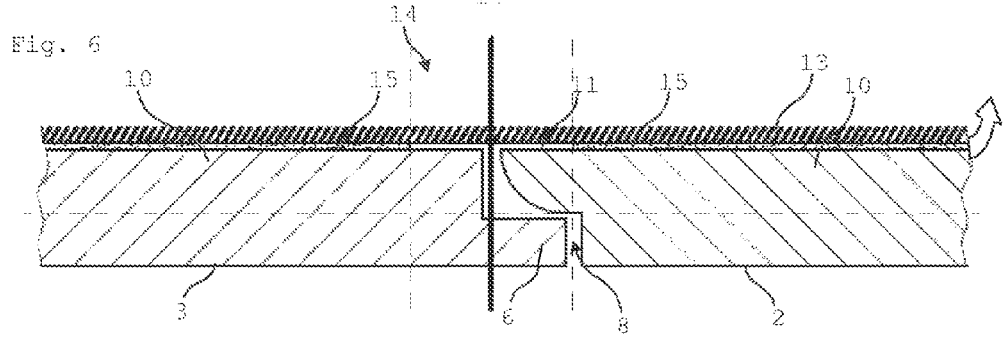
Figure 7A:
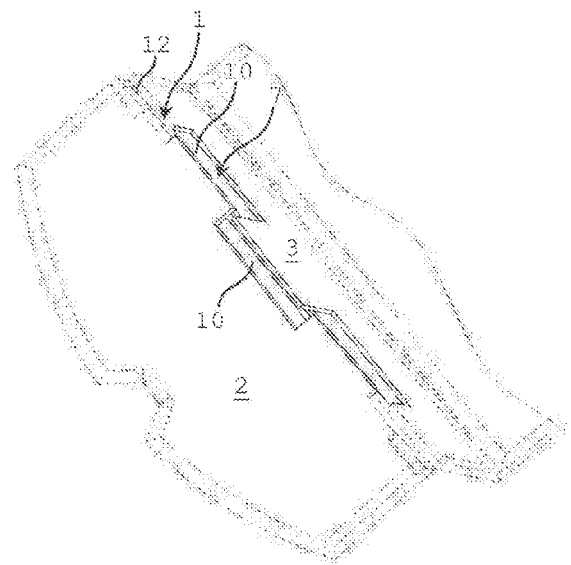
Figure 7B:
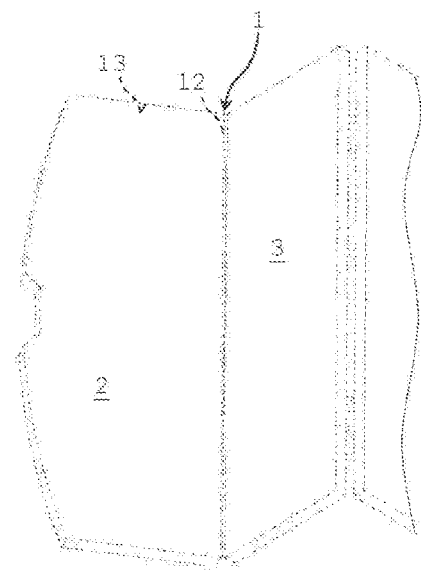

FIG. 6 shows a sectional depiction in a plane 6 - 6 from FIG. 4 and, through the selection of the intersecting plane, provides a comparison of the structure of the hinge-like connection 1 with regard to the question of whether the set of teeth 7 now has a tooth 6 on the side of the cargo compartment floor 3 and a recess 8 on the side of the cover flap or vice versa. In each case, the layer 10 above a recess 8 always has a rounding 11 so that an underlying tooth 6 can then roll, so to speak, along this rounding during an opening movement since a gap between the layers 10 and the set of teeth has been provided only for the sake of clarity in the drawing and is not present in a practical application. In the closed state, the above-described design of the set of teeth 7 thus permits a reliable transmission of force between the cover flap 2 and the cargo compartment floor 3 with a reciprocal support that largely rules out a unilateral deformation.

FIGS. 7a and 7b show three dimensional sketches of bottom view and top view of a further embodiment of a folding luggage- or cargo compartment floor. In here dashed lines are used to lay the focus on visible parts of the hinge-like connection 1 itself. As the top view of FIG. 7b shows, the internal structure of the hinge-like connection 1 is not visible on the textile covering layer 13. It is the straight boundary 12 and the functionality of said assembly only to give a hint to the hidden hinge-like connection 1.

Figure 8:
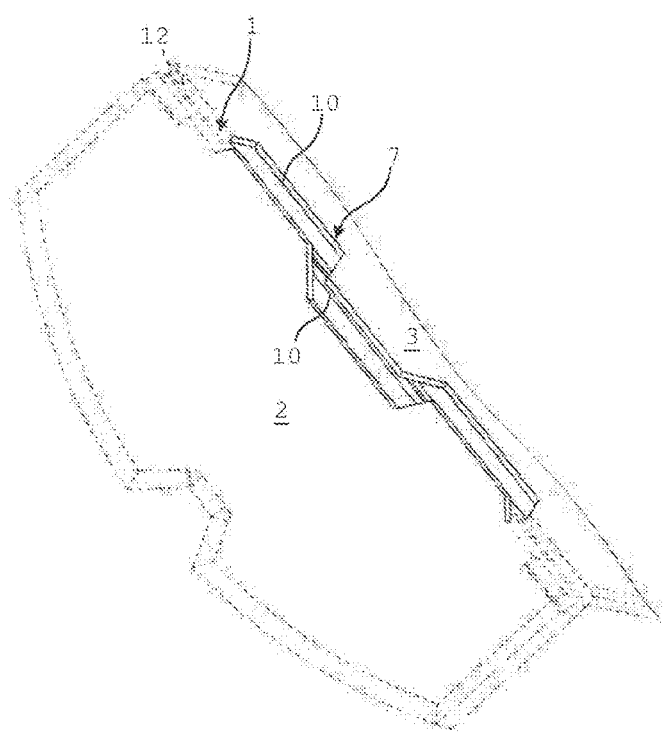

The bottom views of FIGS. 7a and 8 show examples of some variations in that the teeth 6 and recesses 8 in the embodiment of FIG. 7a are essentially rectangular, where they are some kind of trapezoid in the embodiment of FIG. 8. In both embodiments there are no partitions 9 situated between teeth 6 and recesses 8, respectively.

Not limiting the scope of protection of the present invention, a folding luggage- or cargo compartment floor according to the present invention has been disclosed and described when it is in use in any kind of a motor vehicle. The technical principal as disclosed and described may be adapted to constraints and edge conditions of other fields of application easily to cover and/or to close at least one receptacle or any other kind of an opening.

REFERENCE NUMERAL 1 hinge-like connection
2 cover flap
3 cargo compartment floor
4 adjacent region or end surface
5 adjacent region or end surface
6 tooth
7 set of teeth
8 recess
9 partition
10 layer/plane above the set of teeth 7
11 rounding
12 boundary
13 textile covering layer
14 strip without glue layer 15 on layer 10
15 glue layer
16

The invention claimed is:

1. A folding cargo compartment floor, which has a textile covering layer; and under the cargo compartment floor, at least one receptacle is provided, whose opening is closed by a cover flap of the cargo compartment floor, wherein the cover flap is linked to the cargo compartment floor in a hinge fashion and the cover flap and cargo compartment floor, as components of a hinge connection, have directly adjacent regions, which are embodied in at least some places to engage with each other to form a set of teeth; an upper region of the one component as a layer always covers a lower region of the set of teeth on the respective other component.

2. The folding cargo compartment floor according to claim 1, wherein the set of teeth includes teeth and recesses between which respective partitions are situated and the teeth are preferably embodied as essentially rectangular.

3. The folding cargo compartment floor according to claim 1, wherein the layer is as thick in the vertical direction as the set of teeth.

4. The folding cargo compartment floor according to claim 1, the upper layers of the components are situated adjacent to each other.

5. The folding cargo compartment floor according to claim 1, wherein a boundary between the upper layers of the two components is embodied so that it extends in a straight line.

6. The folding cargo compartment floor according to claim 1, wherein the upper layers of the components, in a section lying horizontally above a region of a recess or valley, have a rounding.

7. The folding cargo compartment floor according to claim 1, wherein the rounding is oriented toward the underlying plane of the set of teeth.

8. The folding cargo compartment floor according to claim 1, wherein the cover flap and the cargo compartment floor are covered continuously and in essentially one piece by a textile covering layer; this textile covering layer is glued in position over its entire surface; a strip in the region that functions as a hinge between the cover flap and the adjacent cargo compartment floor is not glued.

9. The folding cargo compartment floor according to claim 1, wherein the dimensions of the strip correspond essentially to those of the region of the set of teeth.

10. A vehicle rear-end structure, wherein the vehicle rear-end structure includes a folding cargo compartment floor according to claim 1.

* * * * *